United States Patent [19]

Hall

[11] 4,011,936
[45] Mar. 15, 1977

[54] CONVEYOR POSITIONING STRUCTURE FOR LOADING AND CONVEYING MACHINES

[75] Inventor: Henry C. Hall, Green Bay, Wis.

[73] Assignee: Northwest Engineering Company, Green Bay, Wis.

[22] Filed: Jan. 2, 1976

[21] Appl. No.: 646,044

[52] U.S. Cl. ............................. 198/517; 198/313; 198/515; 198/522

[51] Int. Cl.² ....................................... B65G 41/02

[58] Field of Search ..................... 214/90 R, 90 A; 198/313, 315, 316, 520, 522, 517

[56] References Cited

UNITED STATES PATENTS

| | | | |
|---|---|---|---|
| 1,908,967 | 5/1933 | FitzSimons | 214/90 R |
| 3,547,287 | 12/1970 | Cunningham | 214/90 R |

*Primary Examiner*—Robert G. Sheridan
*Attorney, Agent, or Firm*—Andrus, Sceales, Starke & Sawall

[57] ABSTRACT

A loading and conveying machine has crawler treads and a frame extending forwardly thereof. A conveyor extends from the front to the rear of the machine. An apron is pivotally mounted at the front of the frame and receives material from a loading implement and deposits it onto the conveyor. The front end of the conveyor is pivotally mounted to the apron and arcuately moves about the apron pivot axis when the apron is raised or lowered. The joined conveyor and apron may also be adjusted together by vertically moving the apron pivot axis. The midsection of the conveyor is articulated so that the conveyor framework is separated into front and rear segments which are independently movable relative to each other and to the machine frame.

16 Claims, 11 Drawing Figures

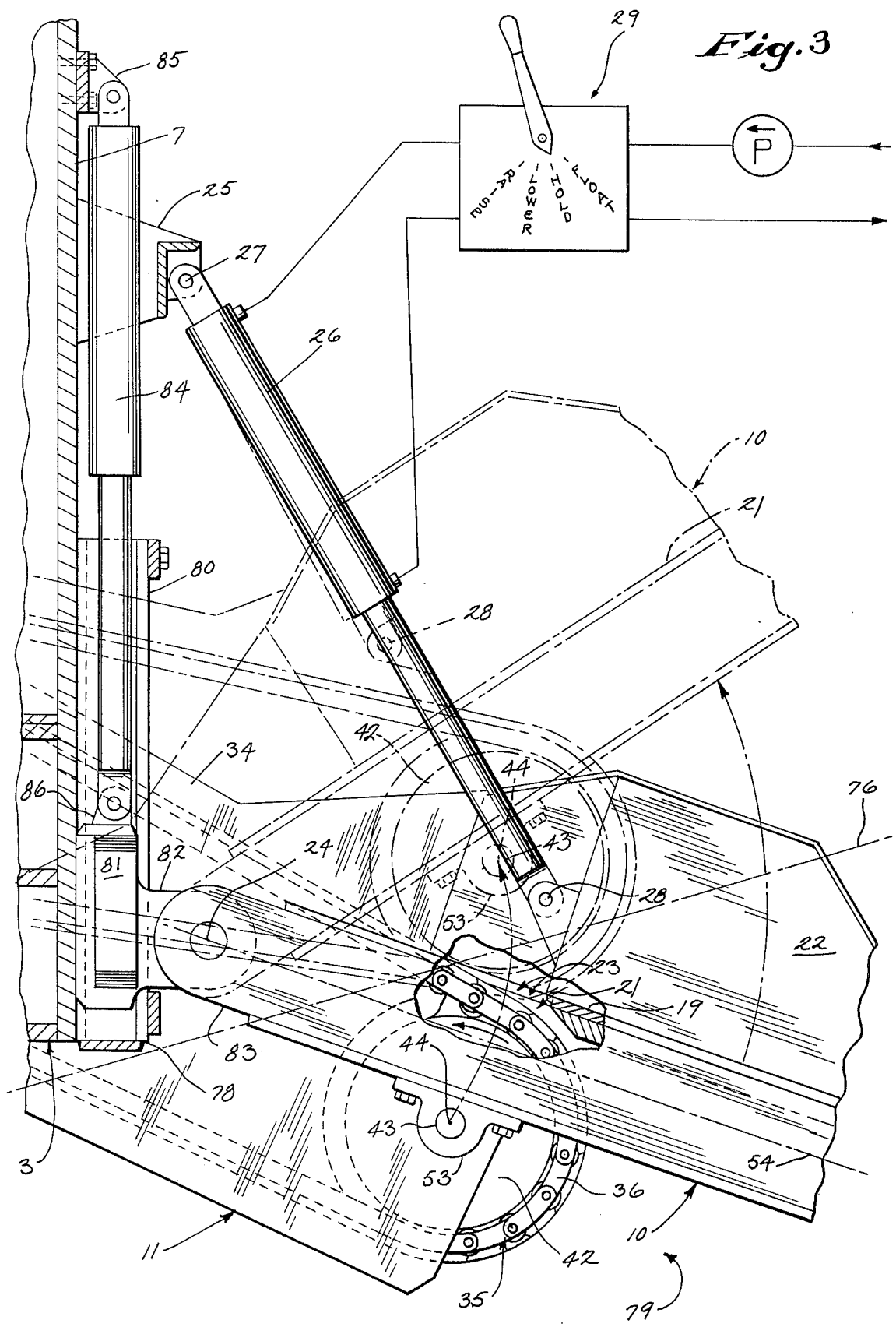

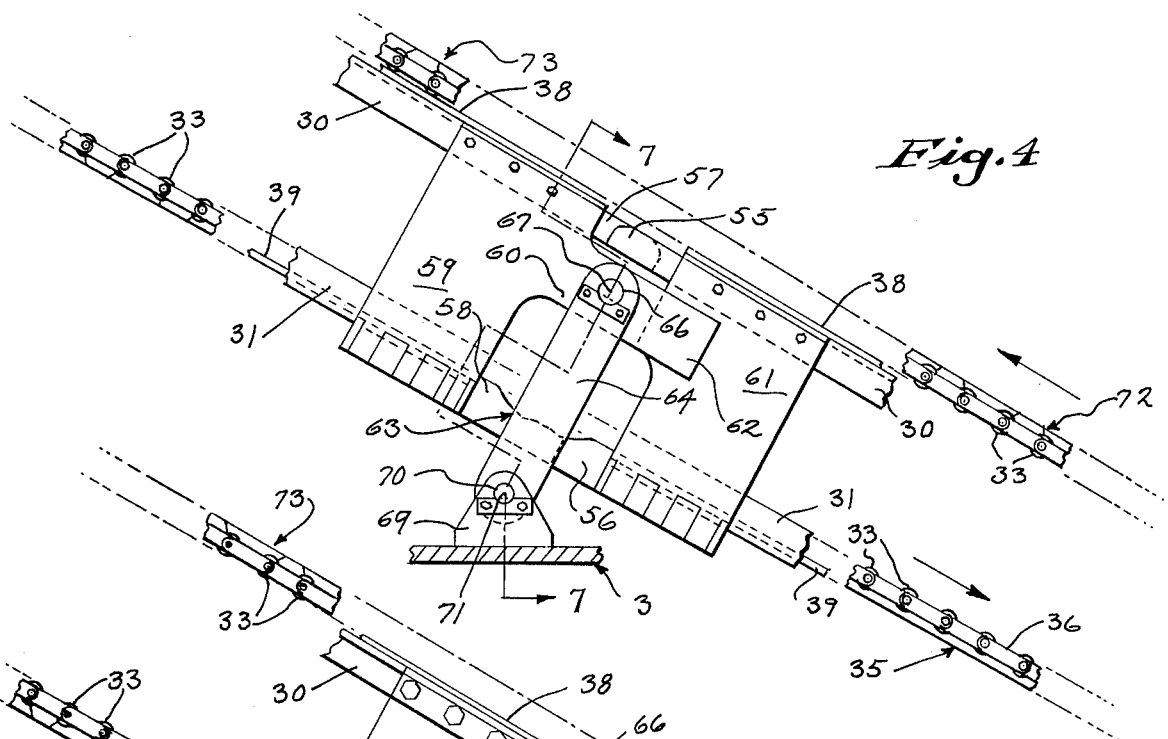
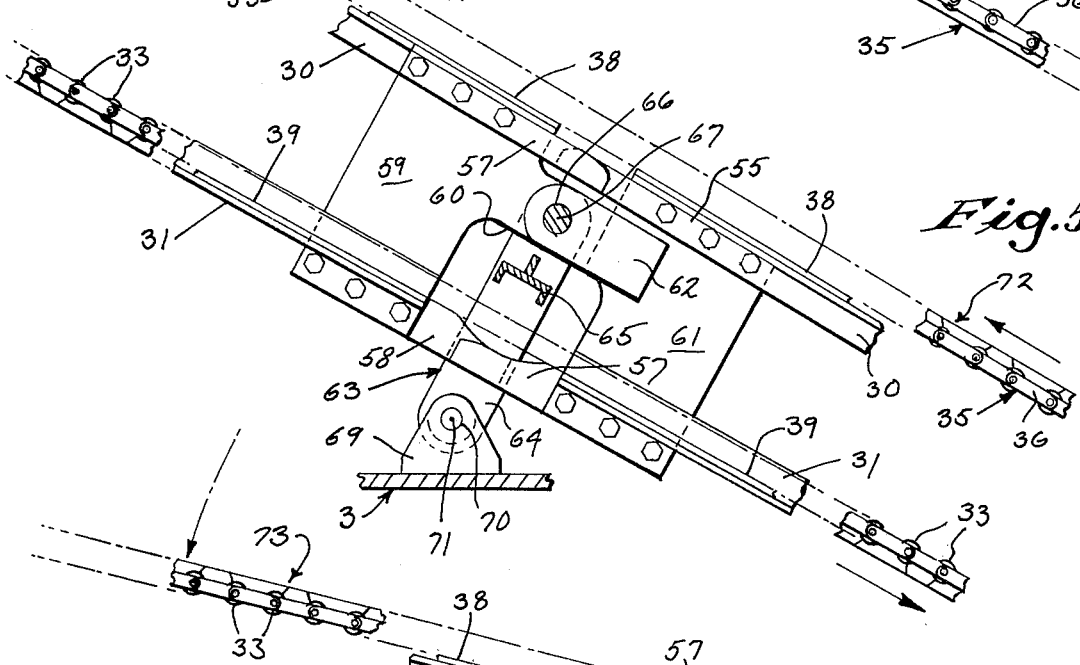
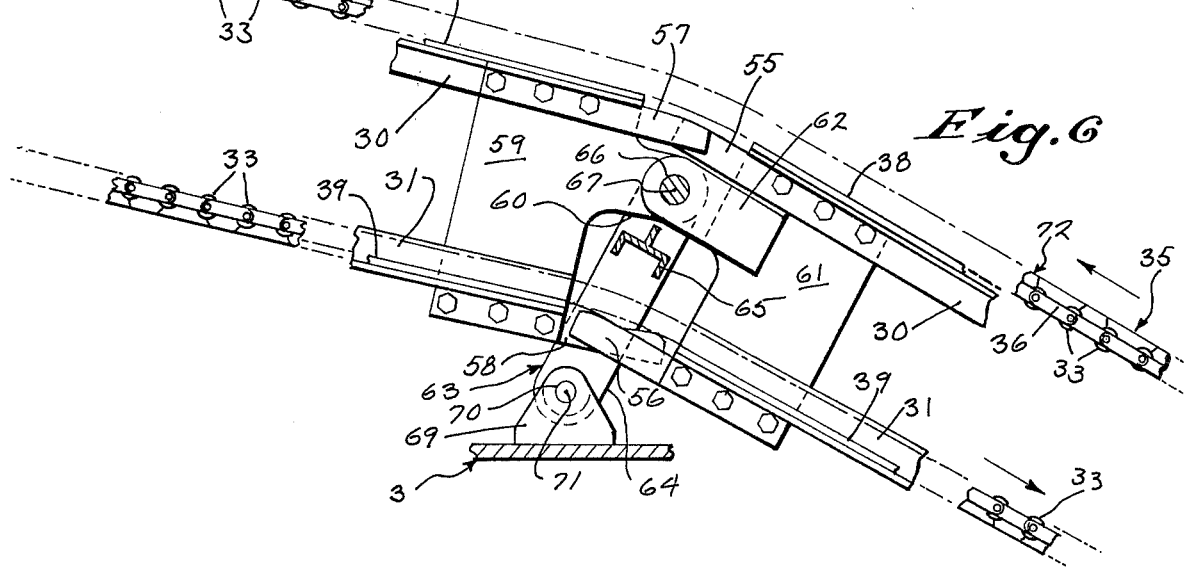

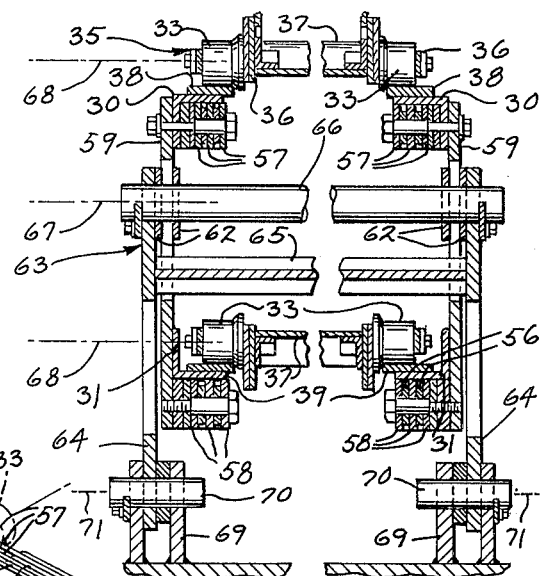
Fig. 7
Fig. 8
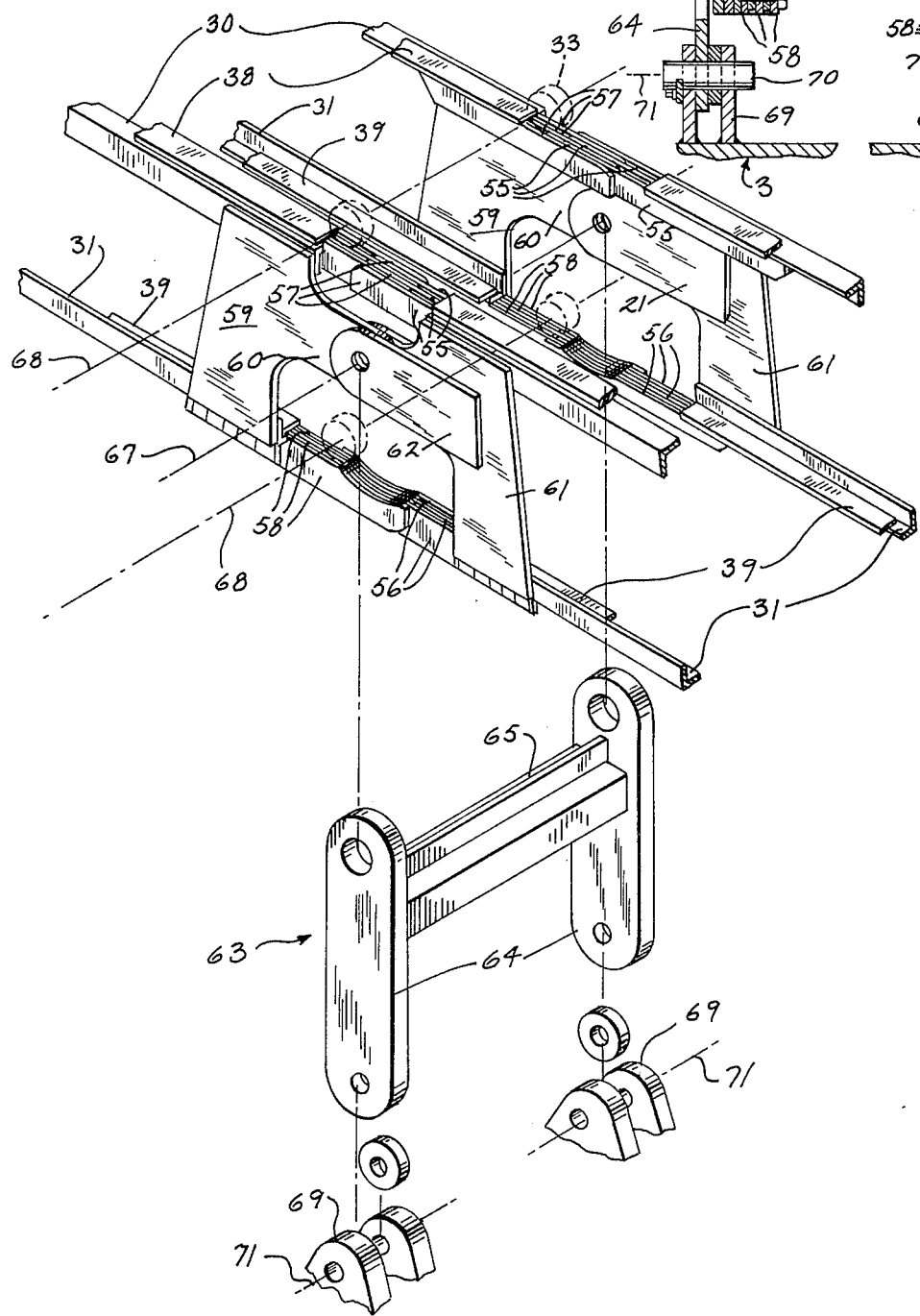

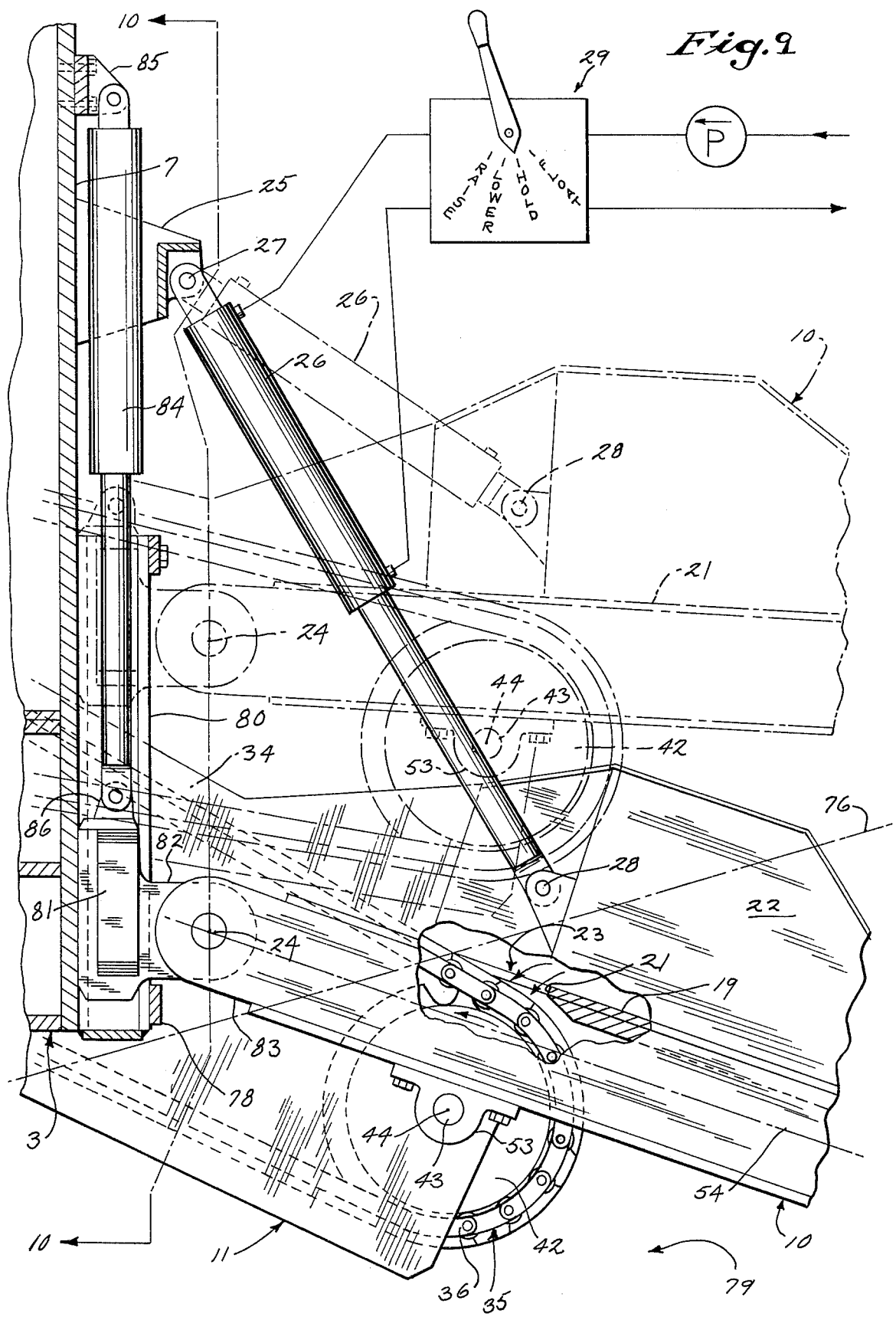

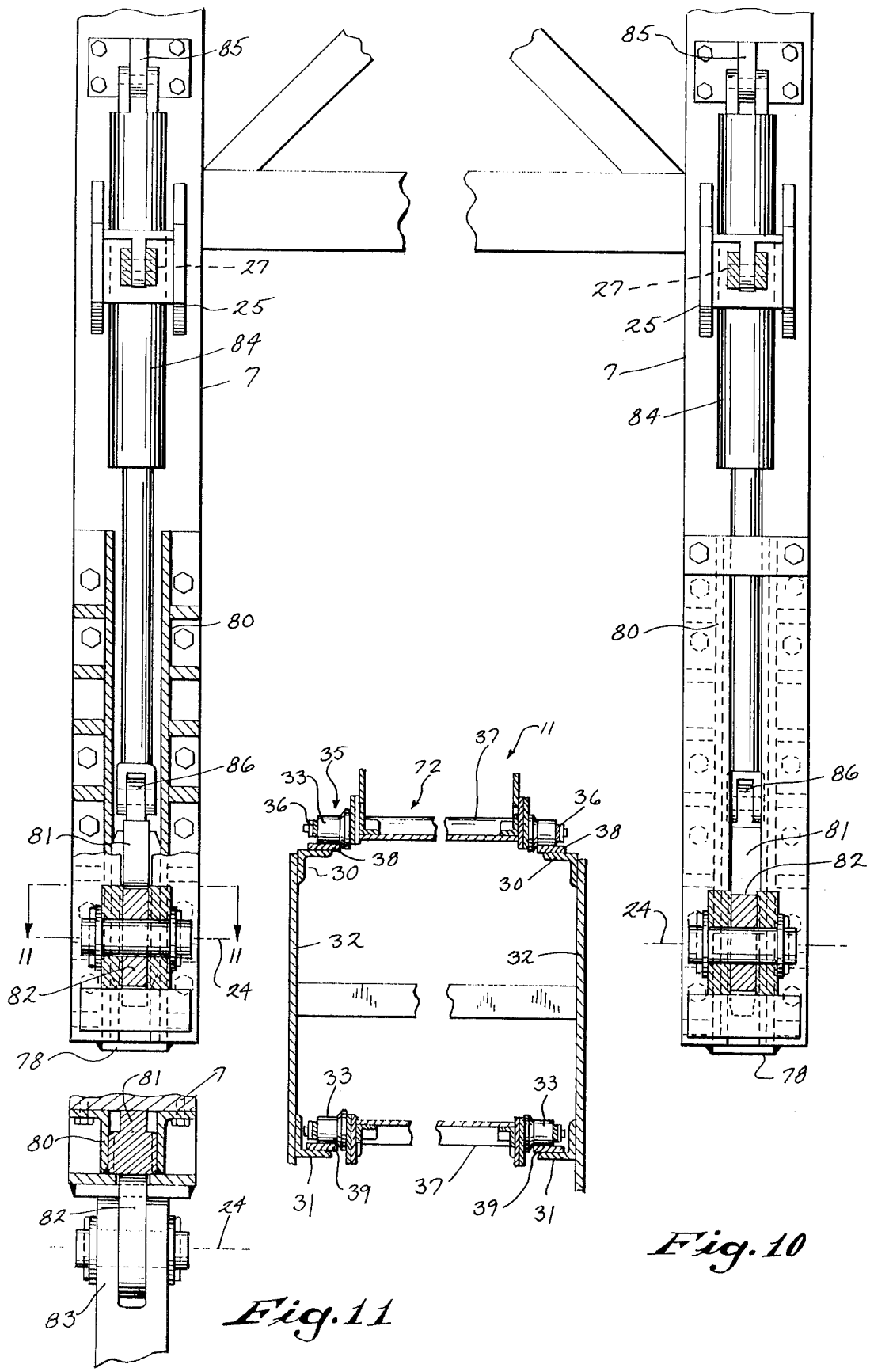

CONVEYOR POSITIONING STRUCTURE FOR LOADING AND CONVEYING MACHINES

| Prior Art of Interest | | |
|---|---|---|
| Patent No. | Inventor | Issue Date |
| 2,696,287 | Foust | 12/ 7/54 |
| 3,283,877 | Santa Maria | 11/ 8/66 |
| 3,302,770 | Schwalm | 2/ 7/67 |
| 3,547,287 | Cunningham | 12/15/70 |
| 3,762,532 | Nelson | 10/ 2/73 |

BACKGROUND OF THE INVENTION

This invention relates to a conveyor positioning structure for loading and conveying machines.

Broadly, such machines utilize a front end gathering implement to sweep rock, sand, ore or other loose material onto a self-contained conveyor for transport to a discharge location, usually disposed at the rear of the machine. An apron is disposed at the forward conveyor end, has a front end edge adapted to move forwardly along the ground with the machine and a rear end portion over which the material moves onto the conveyor. The gathering implement is normally mounted to the front portion of the machine frame, extends substantially ahead of the apron and is adapted to force material up the inclined apron.

Vehicle transport means, such as crawler treads, support the machine on the ground and may be positioned substantially behind the apron and front frame portion to move the center of gravity of the entire device rearwardly in view of the substantial weight forces at the front.

The loading and conveying machines under consideration here can be utilized in tunneling operations, although it is contemplated that they may find more extensive use above ground. In any event, they are often subject to variations in level of terrain, both during actual loading and also during transport from place to place.

In order to accommodate rough terrain, and for transport purposes, it has been found desirable to mount the conveyor on a fixed pivot intermediate its ends and also to pivotally mount the rear of the apron to the machine frame and as low as possible. Pivotal adjustment of these elements had been accomplished by suitable hydraulic cylinders and the like.

It has been found that the gap or clearance space between the rear apron edge and the conveyor should be as narrow as possible. If material rolls backwardly down the inclined conveyor, as sometimes happens, it may tend to enter a gap which is too wide and thereby jam the mechanism.

In some instances, as where the rear apron edge is placed above and slightly forwardly of the conveyor front end, the gap may be so wide that jamming occurs too frequently. On the other hand, too small a gap between the rear apron edge and the conveyor end portion can cause substantial difficulties. Primarily, pivoting of either the conveyor or apron has required careful pivotal adjustment of the other respective element at the same time, lest the two elements collide and damage each other. With the heavy type of machinery involved here, such damage can be extensive and result in undesirably long down times.

The problem can occur when it is desired to lower the rear discharge end of the conveyor to accommodate a dumping receptacle or the like. When the conveyor is mounted on a fixed central pivot, the front conveyor end will be raised and will collide with the rear apron edge unless the apron has been pivoted upwardly. Such re-positioning of the apron may be undesirable because the front apron edge may then no longer rest on the ground. The problem can also arise when the front edge of an apron floating on the ground suddenly drops into a ground depression, causing the rear apron edge to drop and collide with the conveyor, unless the front end of the conveyor has been lowered.

SUMMARY OF THE INVENTION

The present invention is directed to a solution of the above and other problems. As disclosed herein, the front end of the conveyor is pivotally mounted to the apron itself and arcuately moves about the apron pivot axis when the apron is raised or lowered. Such construction minimizes the change in positional relationship adjacent the gap so that the latter can be quite small.

The joined conveyor and apron may also be adjusted together by vertically moving the apron pivot axis.

Furthermore the fixed pivotal support of the midsection of the conveyor is replaced by an articulated structure so that the conveyor framework is separated into front and rear segments which are independently movable relative to each other and to the machine frame.

The resultant structure permits raising and lowering of either end of the conveyor without materially affecting the vertical position of the other end.

BRIEF DESCRIPTION OF THE DRAWINGS

The accompanying drawings illustrate the best mode presently contemplated by the inventor for carrying out the invention.

In the drawings:

FIG. 3 is an enlarged fragmentary side elevation, taken on line 3—3 of FIG. 2 and with parts broken away and sectioned, of the conveyor-apron connection and showing several adjusted positions thereof;

FIG. 4 is an enlarged fragmentary side elevation showing the articulated midsection of the conveyor;

FIG. 5 is a section of the articulated structure taken on line 5—5 of FIG. 2;

FIG. 6 is a view similar to FIG. 5 and showing the articulated structure with the rear conveyor segment lowered;

FIG. 7 is a vertical section taken on line 7—7 of FIG. 4;

FIG. 8 is an exploded perspective view of the articulated structure;

FIG. 9 is a view similar to FIG. 3 and showing the apron pivot adjustment mechanism;

FIG. 10 is a front view taken on line 10—10 of FIG. 9 of the apron pivot adjustment mechanism and with parts broken away and sectioned; and FIG. 11 is a horizontal section taken on line 11—11 of FIG. 10.

DESCRIPTION OF THE PREFERRED EMBODIMENT

Figure 1:
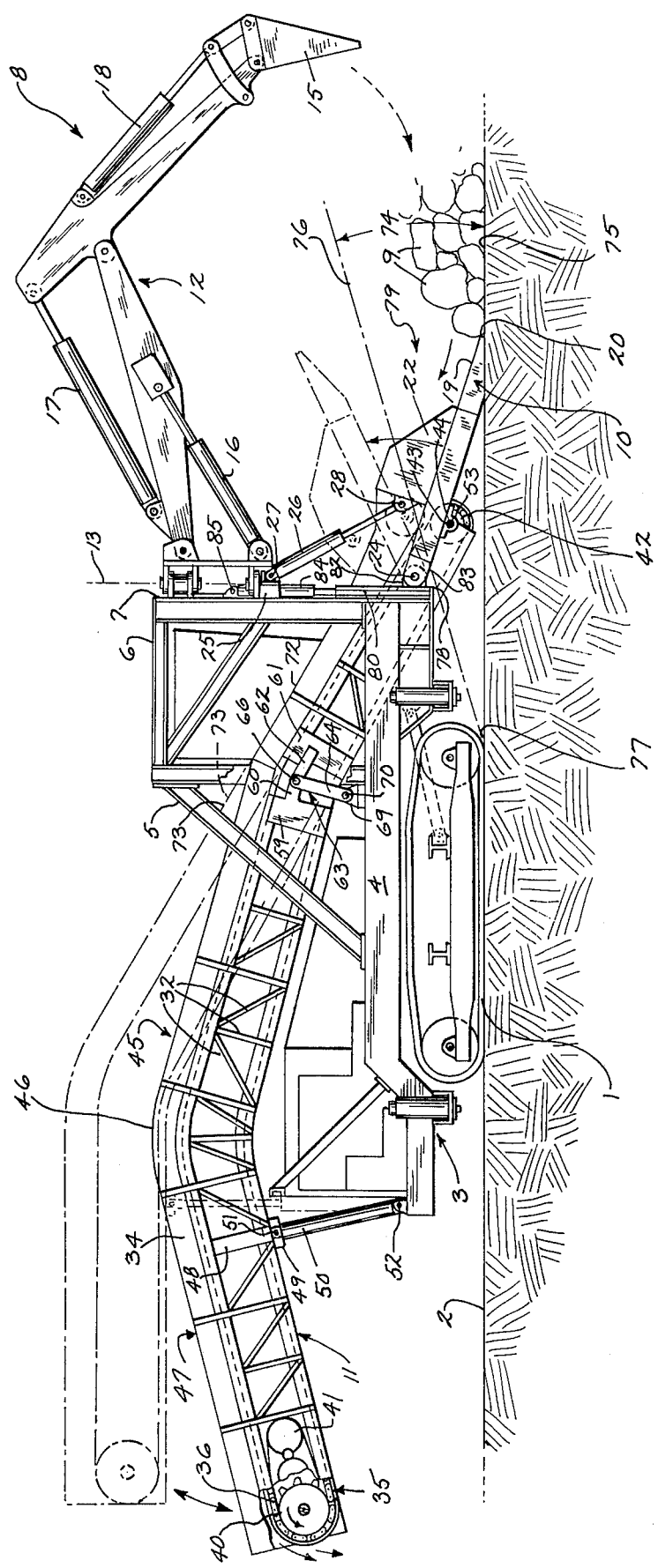
FIG. 1 is a side elevation of a loading and conveying machine constructed in accordance with the invention.

As shown in the drawings, the invention is embodied in a material loading and conveying mechanism having vehicle transport means such as crawler treads 1 which support the machine on the ground 2 and are driven by any suitable means, not shown, to move the machine during loading operations and for travel between operating sites. The front end portion of treads 1 describe an arc and the treads form part of an assembly which supports the machine frame 3 which includes spaced longitudinal side rails 4, brace elements 5, and a forwardly mounted box 6 which may enclose the operator's cab. A pair of vertical mounting plates 7 are disposed on the front face of box 6.

The machine disclosed herein includes a gathering implement assembly 8 adapted to engage loose rocks 9 or the like and sweep them up an inclined apron 10 where they move onto a conveyor assembly 11 for transport to the rear of the machine.

Figure 2:
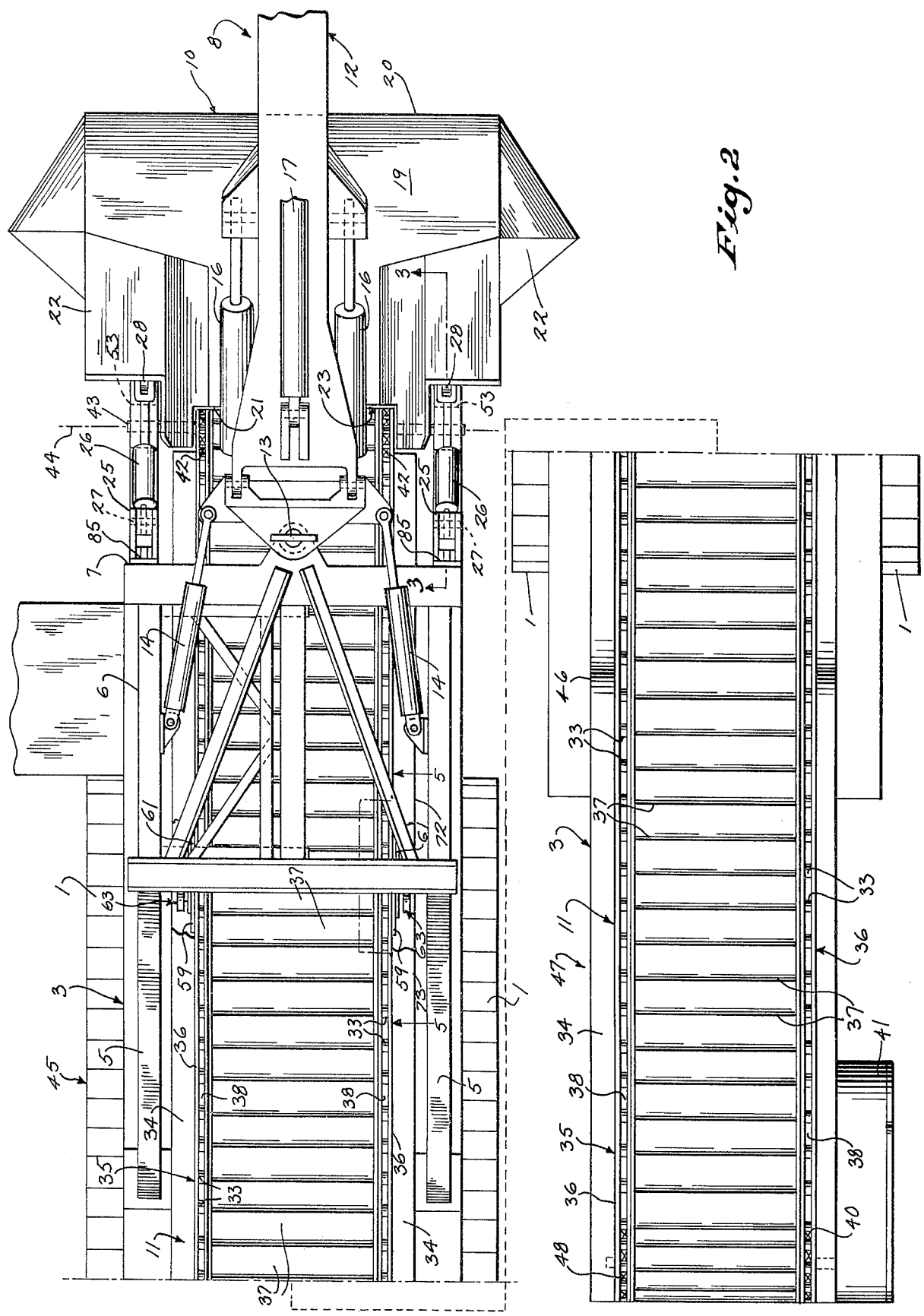
FIG. 2 is a top plan view of the machine.

As best shown in FIGS. 1 and 2, gathering implement assembly 8 forwardly overhangs the machine and generally comprises a boom structure 12 mounted for horizontal swinging pivotal movement about a vertical axis 13, with the swinging control including a pair of swing cylinders 14 being selectively controlled from the operator's cab in the usual well-known manner. Boom structure 12 carries a suitable material handling implement, such as a gathering tool 15, with angular vertical positioning of the elements being accomplished via a series of cylinders 16, 17 and 18, all controllable from the cab in the usual well-known manner.

Apron 10 is adapted to normally ride on the ground ahead of conveyor assembly 11 and is shown as having a central plate-like bed 19 with a front edge 20, a narrow rear edge 21 and suitable raised side members 22 which form a channel or throat through which material is forced by forward machine movement and/or gathering implement assembly 8. The transverse rear edge 21 of bed 19 is disposed above the front end portion of conveyor assembly 11 to thereby provide a clearance space or gap 23 for transfer of material from the apron to the conveyor. See FIG. 3. This gap should be kept at a minimum.

The rear edge 21 of apron 10 is mounted for pivoting about a transverse horizontal axis 24, and means are provided to pivot the apron about said axis. For this purpose, and as best shown in FIGS. 1–3, a pair of brackets 25 are mounted on plates 7, with each bracket being pivotally connected to the upper end of an apron pivot cylinder 26, as at 27. The lower ends of cylinders 26 are pivotally mounted to transversely spaced portions of apron 10, as at 28. Cylinders 26 are of the double acting type and are controlled from the cab in any suitable well-known manner to lift and lower the apron, hold it in any desired raised position, or to permit it to float with its front edge 20 on the ground, as shown in full lines in FIG. 1. The cab control panel 29 for the cylinders is shown schematically in FIG. 3.

Conveyor assembly 11 is shown as being elongated and extending from forwardly of frame box 6 to substantially behind the rear frame portion of the machine. Assembly 11 comprises a generally rectangular framework having elongated upper and lower corner angle members 30 and 31, respectively, joined by suitable braces 32. Skirt boards 34 extend upwardly and are supported by members 30 to prevent material being transported from falling off the conveyor.

An endless conveyor belt 35 extends from front to rear of the conveyor and forms upper and lower flights. Belt 35 comprises a pair of transversely spaced parallel chains 36 having rollers 33 joined by conveying elements 37 which serve to move the material rearwardly. Chain rollers 33 ride on strip-like wear plates 38, 39 which are secured atop the horizontal flanges of the respective upper and lower angle members 30 and 31.

Chains 36 are trained about a pair of rotatable rear sprockets 40 on the conveyor, with the sprockets being driven from a motor 41. Likewise, chains 36 are trained about a pair of rotatable sprockets 42 disposed at the front end portion of the conveyor and which are mounted on a transverse shaft 43 which in turn is suitably mounted to the conveyor frame. Shaft 43 defines an axis 44.

Conveyor assembly 11 is shown as having a relatively long forward section 45 of steep inclination, and which merges at 46 into a shorter rearward section 47 of lesser incline.

For purposes of support and vertical conveyor adjustment, as will be described in greater detail hereinafter, a pair of spaced vertical struts 48 are mounted at the front of rear section 47 and join, through a cross brace 49 and suitable pivotal connections, with the upper end of a cylinder 50, as on horizontal axis 51. The lower end of cylinder 50 is pivotally mounted to frame 3, as on horizontal axis 52. Cylinder 50 may be actuated from the cab by any suitable well-known mechanism.

As previously indicated, it is desirable to be able to adjust the positions of both apron 10 and the conveyor 11 without causing undesirable interference between them, and while still maintaining gap 23 at a minimum, even though edge 21 is directly above the front end portion of belt 35.

In accordance with one aspect of the invention, the desired result is obtained by pivotally joining the front end portion of conveyor assembly 11 to apron 10 so that they may be vertically adjusted together. For this purpose, and as best seen in FIGS. 1–3, the front sprocket shaft 43 of the conveyor is of such a length that its ends are journalled in transversely spaced bearing supports 53 mounted to the underside of apron 10 and forwardly of the apron pivot axis 24. The connection is such that shaft axis 44 is only slightly offset from the longitudinal apron axis 54.

Referring specifically to FIG. 3, the full line showing is when the machine is operating and the front edge of apron 10 is resting on the ground. When it is desired to raise the apron and/or conveyor front end, for example to clear an obstruction or for fast travel, cylinders 26 are actuated from control panel 29 to lift apron 10 upwardly, which carries with it the front conveyor end, as on shaft 43. Thus, apron 10 and conveyor mount axis 44 will move arcuately about the conveyor pivot axis 24. One of an infinite number of raised positions of the elements is shown in phantom in FIG. 3.

Cylinders 26 can be said to have a dual function. Their actuation not only pivotally adjusts apron 10 about axis 24, but also simultaneously adjusts the vertical orientation of the front end of the conveyor.

It has been found that the size of gap 23 remains substantially the same throughout the full range of front end adjusted positions, thereby substantially eliminating contact between the parts. The need for special caution when making vertical front end adjustments is thereby reduced.

The pivotal joining of the conveyor front end portion and the apron has required elimination of a fixed mid-section pivotal support for the conveyor, in view of the fact that rear support cylinder 50 should be maintained to avoid extreme cantilever-type loading of the conveyor frame. Nevertheless, some sort of mid-support is desirable in view of the heavy loading of the conveyor.

Thus, in accordance with another aspect of the invention, means are provided to permit angulation and support of the conveyor frame at its mid-section. For this purpose, and as best shown in FIGS. 4-8, conveyor frame angle corner members 30, 31 and wear plates 38, 39 are separated into longitudinally spaced front and rear segments. An expansion joint is disposed between the segments to permit conveyor frame shifting. Referring to FIGS. 7 and 8, a plurality of transversely spaced parallel plates 55, 56 having cambered ends are secured to the rear portions of the front segments of upper and lower angle members 30 and 31 respectively, and extend rearwardly from the terminus thereof. Likewise, a plurality of transversely spaced parallel plates 57, 58 are secured to the front portions of the rear segments of upper and lower angle members 30 and 31 respectively, and extend forwardly from the teminus thereof. The adjacent forwardly and rearwardly extending plates form slidingly overlapping leaves which hold the front and rear segments in longitudinal alignment; and since the plates are disposed on edge, their upper edges form a continuation of the traveling support for chain rollers 33.

The articulated conveyor joint is disposed approximately midway of the ends of forward section 45 of conveyor assembly 11 and therefor forwardly of the point of merger 46.

For purposes of supporting the joint on the machine frame, a vertical rear hinge plate 59 is secured between each pair of rear upper and lower angle members 30, 31, and is provided with a forwardly extending tongue 60. Likewise a vertical hinge plate 61 is similarly secured between each pair of the front angle members and is provided with a rearwardly extending clevis 62 into which tongue 60 is received. In addition, a link-like yoke 63 is provided and which comprises a pair of transversely spaced vertically extending elongated legs 64 joined by a horizontal brace 65. The upper ends of legs 64 are pivotally mounted to the joint structure by a shaft 66 passing through aligned openings in the legs and the pair of tongue and clevis connections, with the shaft and openings defining an upper pivot axis 67.

As shown in FIGS. 7 and 8, axis 67 is positioned equidistant from the transverse center axes 68 of the upper and lower chain roller centers so that the total length of chain path around the conveyor frame will remain constant throughout the range of articulating angular movement.

The lower ends of legs 64 are pivotally connected to brackets 69 fixed to machine frame side rails 4, as by suitable stub shafts 70 passing through aligned openings in the members and which define a fixed lower pivot axis 71 adjacent the frame.

The connection utilizing yoke 63 serves to anchor and stabilize the conveyor frame and at the same time permit front-to-rear translation of the front frame segment that will occur during joint movement of the conveyor front end and apron.

The utilization of an articulated conveyor provides substantial flexibility of movement of the various conveying elements. The separated front and rear segments 72 and 73 of the conveyor are now free to move independently of each other.

For example, with apron 10 and front conveyor segment 72 in their lowermost positions, as shown in full lines in FIG. 1, rear conveyor segment 73 may be positioned at its uppermost point with cylinder 50 extended as shown in phantom in FIG. 1. See also FIGS. 4 and 5. In this position, the two conveyor segments are in longitudinally straight axial alignment. It may often by desirable to lower the rear discharge end of the conveyor by retracting cylinder 50 to thereby accommodate a particular material receiving means. The concept of this aspect of the invention makes it possible to lower rear conveyor segment 73 without in any way affecting the position of front segment 72 or of apron 10. This lowered position of segment 73 is shown in full lines in FIG. 1 and also in FIG. 6.

By the same token, apron 10 may be vertically adjusted, as by raising or lowering it with apron pivot cylinders 26, carrying with it the co-joined front conveyor segment 72, without materially affecting the position of rear conveyor segment 73. A similar situation would occur if cylinders 26 were set to their "apron float" position, and if apron 10 pivoted about its axis 24 during machine movement and due to slight ground undulations.

Thus, relative angular articulating conveyor segment movement is provided in both directions on each side of the straight position.

The previously described aspects of the invention may readily be utilized in conjunction with an apron 10 having a pivot axis 24 which is fixedly mounted to machine frame 3. However, in some instances, it may be desirable to make axis 24 vertically adjustable, as will now be described.

As best shown in FIG. 1, the construction of the machine provides an "approach angle" 74 defined by a lower plane 75 coextensive with the ground 2, and an upper plane 76 tangential to the arc described by the front of treads 1, as at 77, and which extends forwardly and upwardly through the lowermost front corner 78 of frame 3. The approach space 79 between planes 75 and 76 should be kept free of machine elements, such as apron 10 and conveyor segment 72, during machine movement over rough terrain.

During normal operation of the machine on level ground, as shown in FIG. 1, the approach angle problem is of little consequence. Thus, as shown in full lines, conveyor segment 72 may be pivotally positioned with its front end intersecting approach plane 76 and disposed in space 79. This front end should normally be as low as possible to minimize the distance rocks 9 must be lifted. In addition, during machine operation it is desirable that the pivot 24 of working apron 10 be as low as possible so that the rearward thrust forces on the apron are transmitted to the frame as horizontally as possible. While pivot 24 is disposed above approach plane 76 and space 79, apron 10 itself extends angularly downwardly to the ground, thus also intersecting plane 76 and disposed within space 79. See also FIGS. 3 and 9.

When it is desired to move the machine in a manner that approach space 79 should be cleared of machine elements, apron pivot cylinders 26 are retracted to pivotally raise the apron body upwardly, carrying with it the co-joined conveyor segment 72. However, as best seen in the phantom showing of FIG. 3, full pivotal raising of apron 10 may not carry conveyor segment 72 to completely above plane 76.

To solve this problem, means are provided to selectively shift the apron pivot axis 24, and thus both the apron and conveyor segment 72, to a position wherein both elements can completely clear space 79 when cylinders 26 are retracted and without materially affecting rear conveyor segment 73. For this purpose, and as best shown in FIGS. 9–11, a vertical guide 80 is secured to each mounting plate 7 and extends upwardly from adjacent lower frame corner 78. A follower or slide block 81 is mounted in each guide for vertical travel therein. Each slide block 81 is provided with a forwardly extending ear 82 to which is pivotally attached a corresponding clevis 83 on the rearward portion of apron 10. The connection between these elements defines the apron pivot axis 24. Each slide block 81, and thus axis 24, is vertically shiftable by a motive means such as a shift cylinder 84 which is pivotally mounted at its upper end to a bracket 85 on the respective plate 7, and at its lower end to an ear 86 extending upwardly from slide block 81. Cylinders 84 are actuated from the cab in any suitable well-known way to raise and lower axis 24 and thus apron 10 and co-joined conveyor segment 72 to any of an infinite number of desired positions. See the phantom showing of the uppermost position in FIG. 9 wherein all elements will now be above plane 76, leaving no obstructions in approach space 79.

The various aspects of the invention provide a substantially improved material loading and conveying machine. The pivotal connection of the apron and front conveyor segment reduces problems of relative positioning of these elements. The articulated mid-section conveyor joint makes it possible to vertically adjust the rear conveyor segment without affecting the front conveyor segment or its connected apron; and also to vertically and pivotally adjust the apron and front conveyor segment without materially affecting the rear segment. Clearing of the machine approach space when desired is readily accomplished.

While numerous cylinders and associated elements have been shown and described herein, either singly or in pairs, any number of such elements may be utilized without departing from the spirit of the invention.

Various modes of carrying out the invention are contemplated as being within the scope of the following claims particularly pointing out and distinctly claiming the subject matter which is regarded as the invention.

I claim:

1. In a machine for loading and conveying loose material such as rocks and the like:
   a. transport means for supporting and moving said machine on the ground,
   b. a machine frame carried by said transport means,
   c. material gathering means connected to the front portion of said frame,
   d. an elongated conveyor extending from the front to the rear of the machine,
   e. an apron disposed at the front of the machine and having a bed extending forwardly from above the front portion of said conveyor for transfer of material from said gathering means to said conveyor,
   f. means mounting the rear portion of said apron for pivotal movement about a transverse horizontal axis,
   g. means pivotally mounting the front portion of said conveyor to said apron,
   h. and means for vertically adjusting said apron so that the said front portion of said conveyor is simultaneously vertically adjusted.

2. The machine of claim 1 wherein said vertical adjustment means comprises means connected between said frame and said apron to pivot the latter and thereby the said front portion of said conveyor about said horizontal axis.

3. The machine of claim 1 wherein said vertical adjustment means comprises means connected between said frame and said first-named mounting means to vertically move the latter and said axis, and thereby the apron and said front portion of said conveyor.

4. The machine of claim 1 wherein said vertical adjustment means comprises:
   a. first selectively operable means connected between said frame and said apron to pivot the latter and the said front portion of said conveyor about said horizontal axis,
   b. and second selectively operable means connected between said frame and said first-named mounting means to vertically move the latter and said axis, and thereby the apron and said front portion of said conveyor.

5. The machine of claim 1:
   a. wherein said apron has a longitudinal axis,
   b. wherein said second-named pivotal mounting means defines a second horizontal axis,
   c. and wherein said second horizontal axis is offset slightly from said longitudinal axis.

6. The machine of claim 1 which includes means separating said conveyor at its midsection into independently movable front and rear segments.

7. The machine of claim 6 which includes:
   a. means supporting said rear conveyor segment rearwardly of said separating means,
   b. and means for actuating said supporting means to thereby vertically adjust said rear segment independently of said front segment and said apron.

8. The machine of claim 7 wherein said co-joined front conveyor segment and apron are movable independently of said rear segment.

9. The machine of claim 7 in which said first-named mounting means and said vertical adjusting means for said apron are constructed so that the front end portion of said apron is selectively floatable on the ground during machine travel, so that both said apron and front conveyor segment are movably responsive to encountered ground undulations.

10. The machine of claim 6 in which said conveyor separating means comprises an articulated joint pivotally connected to said frame.

11. The machine of claim 6 in which said conveyor separating means forms joint means comprising:
    a. means disposed between the terminus portions of said separated segments and defining an upper axis about which said segments are pivotable,
    b. means disposed adjacent said frame and defining a fixed lower axis,
    c. and link means connected between and disposed for pivotal movement about both said last-named axes.

12. The machine of claim 6:
    a. in which said conveyor includes:
       1. a rectangular frame having elongated corner members, 2. an endless conveyor belt supported on said corner members and forming upper and lower flights,
3. and means for driving said belt;
b. and in which said separating means includes an expansion joint having a plurality of slidingly overlapping plates connected between the terminus portions of said segments,
c. said plates being disposed on edge and with their edges forming support means for both flights of said conveyor belt between said separated segments.

13. The machine of claim 12 which further includes:
a. means disposed between the terminus portions of said segments and defining an upper axis about which said segments and said overlapping plates are pivotable,
b. means disposed adjacent said machine frame and defining a fixed lower axis,
c. and link means connected between and disposed for pivotal movement about both said last-named axes.

14. The machine of claim 13 wherein said expansion joint is constructed so that said front conveyor segment is shiftable longitudinally and independently of said rear segment upon joint movement of said front segment and said apron.

15. The machine of claim 13:
a. wherein said link means comprises a yoke member having a pair of vertical side legs and a horizontal connecting brace,
b. which includes means pivotally mounting the upper portion of each said side leg between the conveyor frame corner members,
c. and which also includes means pivotally mounting the lower portions of said side members to said machine frame below said conveyor.

16. In a machine for loading and conveying loose material such as rocks and the like:
a. transport means for supporting and moving said machine on the ground,
b. a machine frame carried by said transport means,
c. material gathering means connected to the front portion of said frame,
d. an elongated conveyor extending from the front to the rear of the machine,
e. an apron disposed at the front of the machine and having a bed extending forwardly from above the front portion of said conveyor for transfer of material from said gathering means to said conveyor,
f. means mounting the rear portion of said apron for pivotal movement about a transverse horizontal axis,
g. means pivotally mounting the front portion of said conveyor to said apron,
h. means for vertically adjusting said apron so that the said front portion of said conveyor is simultaneously vertically adjusted, said vertical adjustment means comprising:
1. first selectively operable means connected between said frame and said apron to pivot the latter and the said front portion of said conveyor about said horizontal axis,
2. and second selectively operable means connected between said frame and said first-named mounting means to vertically move the latter and said axis, and thereby the apron and said front portion of said conveyor,
i. means separating said conveyor at its midsection into independently movable front and rear segments,
j. means supporting said rear conveyor segment rearwardly of said separating means,
k. and means for actuating said supporting means to thereby vertically adjust said rear segment independently of said front segment and said apron,
l. said co-joined front conveyor segment and apron being movable independently of said rear segment.

* * * * *